(12) United States Patent
Geller

(10) Patent No.: US 10,710,588 B2
(45) Date of Patent: Jul. 14, 2020

(54) MERGING AND LANE CHANGE ACCELERATION PREDICTION ENERGY MANAGEMENT

(71) Applicant: Toyota Motor Engineering & Manufacturing North America, Inc., Erlanger, KY (US)

(72) Inventor: Benjamin M. Geller, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 119 days.

(21) Appl. No.: 15/603,231

(22) Filed: May 23, 2017

(65) Prior Publication Data

US 2018/0339708 A1    Nov. 29, 2018

(51) Int. Cl.
| | |
|---|---|
| *B60W 30/18* | (2012.01) |
| *B60W 40/06* | (2012.01) |
| *B60W 50/10* | (2012.01) |
| *B60L 3/00* | (2019.01) |
| *B60W 50/00* | (2006.01) |
| *B60W 50/14* | (2020.01) |

(52) U.S. Cl.
CPC ..... *B60W 30/18163* (2013.01); *B60L 3/0015* (2013.01); *B60W 50/0097* (2013.01); *B60W 50/10* (2013.01); *B60W 50/14* (2013.01); *B60L 2240/68* (2013.01); *B60L 2260/32* (2013.01); *B60W 2050/146* (2013.01); *B60W 2540/043* (2020.02); *B60W 2554/80* (2020.02); *B60W 2554/801* (2020.02); *B60W 2555/20* (2020.02); *B60W 2556/50* (2020.02)

(58) Field of Classification Search
CPC ........... B60W 30/18163; B60W 40/04; B60W 40/06; B60W 50/10; B60L 13/0015
USPC ............................................................ 701/22
See application file for complete search history.

(56) References Cited

U.S. PATENT DOCUMENTS

| | | | |
|---|---|---|---|
| 7,571,053 | B2 | 8/2009 | Ishikura |
| 8,111,147 | B2 | 2/2012 | Litkouhi |
| 9,159,023 | B2 | 10/2015 | Bone et al. |
| 9,296,382 | B2 | 3/2016 | Fung et al. |
| 9,381,916 | B1 * | 7/2016 | Zhu .................. B60W 30/0956 |
| 9,393,967 | B2 | 7/2016 | Hauler |
| 9,440,507 | B2 | 9/2016 | Giovanardi et al. |
| 2008/0201050 | A1 | 8/2008 | Placke et al. |

(Continued)

*Primary Examiner* — Yazan A Soofi
(74) *Attorney, Agent, or Firm* — Snell & Wilmer L.L.P.

(57) ABSTRACT

Methods, systems, and apparatus for a lane assist system that prepares the vehicle to move from a current lane to an adjacent lane. The lane assist system includes a sensor for detecting one or more surrounding vehicles in an adjacent lane and an electronic control unit. The electronic control unit is connected to the sensor. The electronic control unit is configured to predict or determine predict or determine that the vehicle intends to or is moving from a current lane to an adjacent lane. The electronic control unit is configured to determine one or more locations of the one or more surrounding vehicles in the adjacent lane, and control operations of the vehicle to prepare the vehicle for a lane change to a first open space or area in the adjacent lane based on the one or more locations of the one or more surrounding vehicles.

20 Claims, 7 Drawing Sheets

(56) References Cited

U.S. PATENT DOCUMENTS

| | | | |
|---|---|---|---|
| 2009/0284360 A1* | 11/2009 | Litkouhi | B60Q 9/00 |
| | | | 340/439 |
| 2011/0098922 A1 | 4/2011 | Ibrahim | |
| 2014/0005923 A1* | 1/2014 | Bank | G01C 21/3658 |
| | | | 701/424 |
| 2014/0074356 A1* | 3/2014 | Bone | G08G 1/167 |
| | | | 701/41 |
| 2015/0194055 A1* | 7/2015 | Maass | B60W 50/14 |
| | | | 340/905 |
| 2015/0291146 A1 | 10/2015 | Prakah-Asante et al. | |
| 2015/0379362 A1 | 12/2015 | Calmes et al. | |
| 2016/0238404 A1 | 8/2016 | Okada et al. | |
| 2016/0297447 A1* | 10/2016 | Suzuki | B60W 30/16 |
| 2016/0298971 A1 | 10/2016 | Mughal et al. | |
| 2016/0339913 A1 | 11/2016 | Yamashita et al. | |
| 2016/0363935 A1 | 12/2016 | Shuster et al. | |
| 2017/0151982 A1* | 6/2017 | Fujii | B60W 10/20 |
| 2017/0259816 A1* | 9/2017 | Takeda | B60W 30/16 |
| 2018/0286242 A1* | 10/2018 | Talamonti | B62D 15/029 |
| 2018/0339708 A1* | 11/2018 | Geller | B60W 30/18163 |
| 2019/0225843 A1* | 7/2019 | Kalgutkar | C09D 183/10 |

* cited by examiner

US 10,710,588 B2

MERGING AND LANE CHANGE ACCELERATION PREDICTION ENERGY MANAGEMENT

BACKGROUND

1. Field

This specification relates to a system and a method for improving vehicle efficiency by preparing a vehicle to move into an adjacent lane.

2. Description of the Related Art

Many accidents occur when a vehicle changes, moves or merges into another lane. Driver lane assist systems, such as blind spot cameras, are used to detect vehicles in a driver's blind spot and alert the driver to improve safety. These driver lane assist systems, however, are reactive systems that account for an approaching vehicle in a blind spot of the vehicle. As such, the driver reacts by either suddenly accelerating or decelerating the vehicle to move the vehicle into the adjacent lane. The sudden acceleration or deceleration of the vehicle by the driver results in an inefficient use of fuel or energy.

Accordingly, there is a need for a system and method for predicting and preparing the vehicle to merge or move from a current lane into an adjacent lane while maximizing fuel efficiency and minimizing driver response time.

SUMMARY

In general, one aspect of the subject matter described in this specification is embodied in a lane assist system for a vehicle. The lane assist system includes a sensor for detecting one or more surrounding vehicles in an adjacent lane and an electronic control unit. The electronic control unit is connected to the sensor. The electronic control unit is configured to predict or determine predict or determine that the vehicle intends to or is moving from a current lane to an adjacent lane. The electronic control unit is configured to determine one or more locations of the one or more surrounding vehicles in the adjacent lane, and control operations of the vehicle to prepare the vehicle for a lane change to a first open space or area in the adjacent lane based on the one or more locations of the one or more surrounding vehicles.

These and other embodiments may optionally include one or more of the following features. The lane assist system may include a battery for storing electrical energy. The lane assist system may include a battery management unit for managing charging and discharging of the electrical energy of the battery to power movement of the vehicle, and a motor that uses the electrical energy to power movement of the vehicle.

The electronic control unit may be configured to determine or predict a location of the first open spare or area in the adjacent lane based on the one or more locations of the one or more surrounding vehicles. The electronic control unit may be configured to calculate a distance between two vehicles of the one or more surrounding vehicles in the adjacent lane that are in proximity to the vehicle and determine or predict that the distance will be greater than or equal to a threshold distance if the vehicle were to merge between the two vehicles. The threshold distance may be based on at least one of weather condition information, road condition information or surrounding vehicle information.

The lane assist system may include one or more external databases that provide surrounding vehicle information of the one or more surrounding vehicles. The lane assist system may include a navigation unit for providing a current location of the vehicle. The electronic control unit may be connected to the navigation unit and the one or more external databases via a network. The electronic control unit may be configured to determine the one or more locations of the one or more surrounding vehicles based on the current location of the vehicle and the surrounding vehicle information.

The lane assist system may include a user interface element for receiving driver input that indicates that a driver intends to merge the vehicle into the adjacent lane. The electronic control unit may be configured to obtain the driver input or a lane change event. The electronic control unit may be configured to autonomously or automatically predict or determine that the vehicle intends to or is moving from the current lane to the adjacent lane based on the lane change event. The electronic control unit may be configured to predict or determine that the vehicle intends to or is moving from the current lane to the adjacent lane in response to driver input.

The electronic control unit may include a user interface for providing an indication that the vehicle is preparing to move from the current lane to the adjacent lane. The electronic control unit may be configured to provide the indication that the vehicle is preparing for the lane change through the user interface.

The electronic control unit may be configured to determine whether the vehicle needs to accelerate or decelerate to move to the first open space or area in the adjacent lane. The electronic control unit may be configured to control the operations of the vehicle based on the determination of whether the vehicle needs to accelerate or decelerate. The electronic control unit may be configured to spool the engine of the vehicle if the vehicle needs to accelerate.

In another aspect, the subject matter is embodied in a method for controlling operation of a vehicle to assist in lane changing. The method includes obtaining, from at least one of a sensor or an external database, one or more locations of one or more surrounding vehicles. The method includes obtaining, from a navigation unit, a current location of the vehicle. The method includes determining or predicting, by an electronic control unit, that the vehicle intends to or is moving from a current lane to an adjacent lane. The method includes determining, by the electronic control unit, one or more locations of one or more open spaces or areas based on the one or more locations of the one or more surrounding vehicles and the current location of the vehicle. The method includes controlling, by the electronic control unit, an operation of the vehicle to prepare for a lane change of the vehicle based on the one or more locations of the one or more open spaces or areas.

In another aspect, the subject matter is embodied in a lane assist system. The lane assist system includes an electronic control unit. The electronic control unit is configured to determine one or more locations of one or more surrounding vehicles in a first adjacent land and in a second adjacent lane. The electronic control unit is configured to predict or determine that the vehicle intends to move to either the first adjacent lane or the second adjacent lane, and control operations of the vehicle to prepare for a lane change of the vehicle based on the one or more locations of the one or more surrounding vehicles.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for automatically predicting and preparing the vehicle to merge or shift into an adjacent lane to maximize fuel efficiency and minimize driver response time. Particular embodiments of the subject matter described in this specification may be implemented to realize one or more of the following advantages.

A lane assist system automatically predicts or determines when the vehicle intends to or is moving from a current lane to an adjacent lane. The lane assist system predictively prepares the vehicle to move from a current lane into the adjacent lane. By predictively preparing the vehicle to move into the adjacent lane, the lane assist system increases the vehicle's response time in moving, changing or merging the vehicle into an open space or area in an adjacent lane. This allows the vehicle to move into an open space or area that the vehicle is otherwise unable to move into.

Moreover, by proactively preparing the vehicle to move into the open space or area in the adjacent lane, the vehicle may utilize the battery, engine, motor or other energy source more efficiently. For example, if the lane assist system identifies that the vehicle will be accelerating to move into an open space or area in the adjacent lane, the lane assist system may gradually spool the engine to prepare the vehicle for the acceleration. By gradually spooling the engine instead of reactively responding to an abrupt depression of the accelerator pedal, less fuel energy is used to accelerate the vehicle into the adjacent lane.

Other benefits and advantages include accounting for other conditions when preparing the vehicle to move into an open space or area in an adjacent lane. The lane assist system may account for road, weather and traffic when determining whether an open space or area in an adjacent lane is of sufficient size to move the vehicle into. For example, the open space or area in an adjacent lane may need to be larger when the road is icy than under normal conditions because of the inclement weather.

Figure 1:
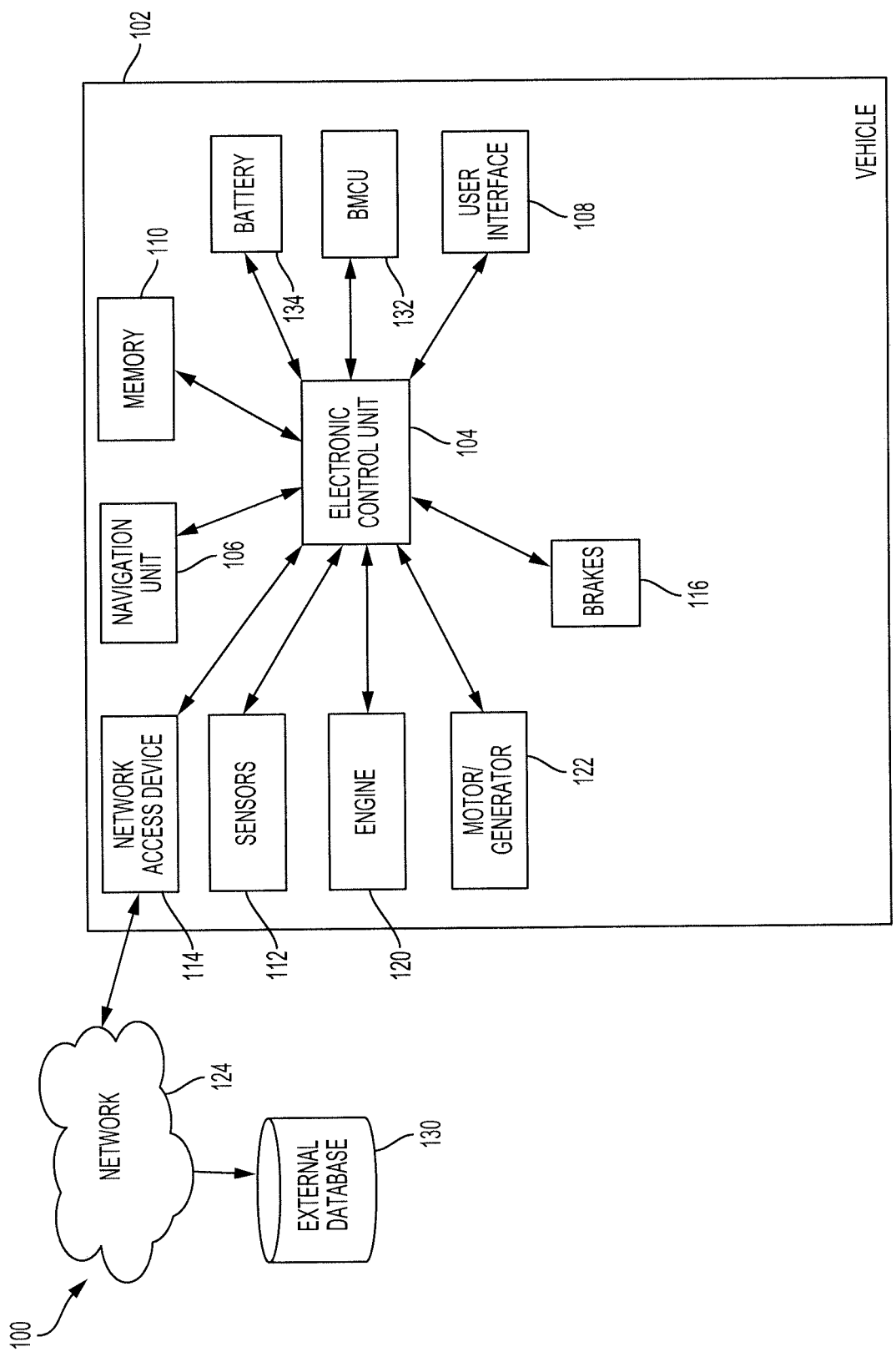
FIG. 1 is a block diagram of an example lane assist system for a vehicle according to an aspect of the invention.

FIG. 1 is a block diagram of an example lane assist system 100 for a vehicle 102. The lane assist system 100 includes one or more computers or electronic control units (ECUs) 104, appropriately programmed, to prepare the vehicle 102 to move into an open space or area in an adjacent lane. The lane assist system 100 may include one or more sensors 112, a navigation unit 106, a user interface 108, and a memory 110. The lane assist system 100 may, for example, spool an engine 120 to prepare the vehicle 102 for acceleration or manage the battery flow of the battery 134 using the battery management control unit (BMCU) 132 to better capture electrical energy from the brakes 116, such as from regenerative braking, to prepare the vehicle 102 to decelerate.

The lane assist system 100 may be included in a vehicle 102 and be connected to a network 124 that may assist in communicating with one or more sensors 112, the one or more external databases 130 or other components of the lane assist system 100. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes a motor and/or generator 122. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 112 and/or navigation unit 106 to drive autonomously.

The vehicle 102 may be coupled to a network 124. The network 124, such as a local area network (LAN), a wide area network (WAN), a cellular network, a digital short-range communication (DSRC), the Internet, or a combination thereof, connects the vehicle 102, the one or more external databases 130 and/or components of the lane assist system 100. The external databases 130 may include databases from different service providers. A service provider may provide navigational map, weather and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 130 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include a route that the vehicle 102 intends to travel. The route may include a starting location, a destination location and a path between the starting location and the destination location. The navigational map information may include terrain, political, traffic condition, roadway and/or construction information along the route. Political information includes political features such as cities, states, zoning ordinances, and laws and regulations, and traffic signs. Roadway information includes road features such the grade of an incline of a road and/or the boundaries of one or more lanes that make up the roadway. Construction information includes construction features such as construction zones and construction hazards. Traffic condition information includes one or more traffic condition features, such as a stop sign, traffic signal, traffic congested areas or accident areas. The traffic condition information may provide information related to the density and movement of vehicles on a roadway and/or accident locations. Traffic condition information may include real-time information of the traffic congested areas or accident areas. The real-time information may include the traffic in a particular lane. Terrain information may include terrain features, such as hills, flat terrains, or curves, and/or topographical information.

Features, e.g., terrain features, road features, political features, or traffic condition features, which may be derived from the terrain, roadway, political or traffic condition information, each have a location that may be identified by map coordinates. The map coordinates may be defined by latitude and longitudinal coordinates.

The vehicle 102 may include an engine 120, a motor and/or a generator 122, battery 134 and a battery management and control unit (BMCU) 132. The motor and/or generator 122 may be an electric motor and an electric generator that converts electrical energy into mechanical power, such as torque, and converts mechanical power into electrical energy. The motor and/or generator 122 may be coupled to the battery 134. The motor and/or generator 122 may convert the energy from the battery 134 into mechanical power, and may provide energy back to the battery 134, for example, via regenerative braking. The engine 120 combusts fuel to provide power instead of and/or in addition to the power supplied by the motor and/or generator 122. Other power sources may include other types of fuel cells, such as hydrogen fuel cells. The vehicle 102 may include brakes 116 for slowing and/or stopping the vehicle 102.

The battery 134 may be coupled to the motor and/or generator 122 and may provide electrical energy to and receive electrical energy from the motor and/or generator 122. The battery 134 may include one or more rechargeable batteries.

The BMCU 132 may be coupled to the battery 134 and control and manage the charging and discharging of the battery 134. The BMCU 132, for example, may measure, using battery sensors (not shown), parameters used to determine the state of charge (SOC) of the battery 134 or may prepare the battery 134 to discharge electrical energy to provide to the motor and/or generator 122 to accelerate the vehicle 102.

The one or more ECUs 104 may be implemented as a single ECU or in multiple ECUs. The ECU 104 may be electrically coupled to some or all of the components of the vehicle 102. The ECU 104 may be coupled to at least one of the navigation unit 106, the one or more sensors 112, the network access device 114 and/or the memory 110. The ECU 104 may include one or more processors or controllers specifically designed for controlling operations of the vehicle 102, such as spooling the engine 120, charging or discharging the battery 134 or operating the one or more sensors 112 to provide situational awareness of the one or more vehicles surrounding the vehicle 102 in the adjacent lanes.

The memory 110 may be coupled to the ECU 104. The memory 110 may store instructions to execute on the ECU 104 and may include one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 104. The memory 110 may store driver profiles that include driving behavior patterns of a driver. The driving behavior patterns of a driver may indicate patterns of when the driver prefers to or is likely to accelerate or decelerate to move into an adjacent lane. For example, if a driver is on a highway and is traveling below the speed of the flow of traffic in the adjacent lanes, some drivers are more aggressive and are more likely to move into the adjacent lane while some drivers are content with remaining in their current lane. The lane assist system 100 may know that "John Doe" is an aggressive driver, and thus, predict or determine that "John Doe" will want to merge or shift into an adjacent lane that is traveling at a faster speed.

The network access device 114 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 114 may transmit data to and receive data from devices and systems not directly connected to the vehicle 102. For example, the ECU 104 may communicate with the external databases 130. Furthermore, the network access device 114 may access the network 124, to which the external databases 130 are also connected.

The one or more sensors 112 may be coupled to the ECU 104 and include a motion sensor, vehicle speed sensor, and/or one or more proximity sensors. The motion sensor measures the motion of the vehicle 102. The motion sensor may be an accelerometer, gyroscope, inertia measurement unit or other motion sensing device. The vehicle speed sensor measures the speed of the vehicle 102, for example, by measuring the total revolutions of the wheel per minute. The one or more proximity sensors may be positioned on the front, sides and/or rear of the vehicle 102 to detect surrounding vehicles and/or objects that are within a threshold distance of the vehicle 102 in the front, sides and/or back of the vehicle 102, respectively. The proximity sensor may use radar, a camera, vehicle-to-vehicle (V2V) communication or other means to detect and/or measure a distance to the other vehicles or objects. The one or more sensors 112 may include one or more cameras that may be used to identify a driver to determine a driver profile to be used as baseline for the driver behavior patterns. The one or more proximity sensors may be able to detect the speed and direction of travel of the one or more surrounding vehicles and/or the relative difference in speed and/or distance between two surrounding vehicles.

The navigation unit 106 may be coupled to the ECU 104 and provide vehicle information and/or navigational map information to the ECU 104. The navigation unit 106 may have or be connected to a Global Positioning System (GPS) device. The vehicle information may include the current position, location, direction of travel and/or speed of the vehicle 102.

The user interface 108 provides an interface to the driver and/or other occupant of the vehicle 102 to interact with or receive output from the ECU 104. The user interface 108 may have a user interface element, such as a touch-screen, button, knob, graphical user interface or other input/output device connected to the ECU 104 to provide input to the ECU 104 or output from ECU 104, such as to display a notification or provide an indicator.

Figure 2:
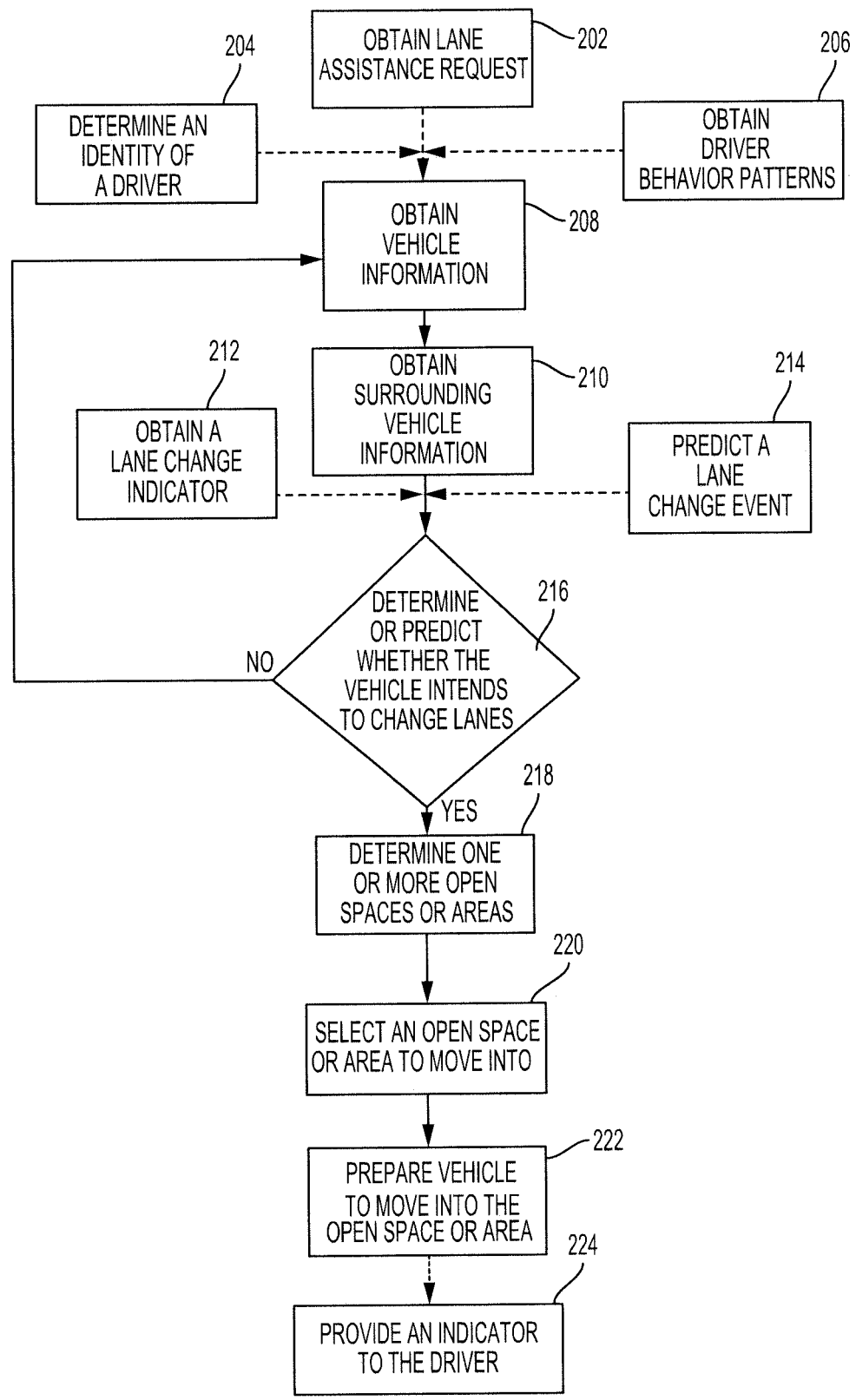
FIG. 2 is a flow diagram of an example process for preparing the vehicle 102 to move into an open space or area in an adjacent lane according to an aspect of the invention.

FIG. 2 is a flow diagram of an example process 200 for preparing the vehicle 102 to move into an open space or area in an adjacent lane. One or more computers or one or more data processing apparatuses, for example, the ECU 104 of the lane assist system 100 of FIG. 1, appropriately programmed, may implement the process 200.

The lane assist system 100 may obtain a lane assistance request (202). The lane assistance request is a request to initialize the lane assist system 100. The lane assist system 100 receives the lane assist request when the vehicle 102 becomes operational or when an occupant of the vehicle 102 activates the lane assist system 100, e.g., through a user interface 108.

The lane assist system 100 may receive the lane assist request from one or more sensors 112, such as an engine sensor, when the vehicle 102 is powered on. The lane assist system 100 may receive the lane assist request upon user activation, for example, when a token, such as a key, is inserted to start the vehicle 102. When the lane assist system 100 is initialized, the lane assist system 100 may display an indicator on the user interface 108 to indicate to the driver that the lane assist system 100 is initialized.

The lane assist system 100 may determine an identity of a driver during initialization (204). The lane assistance request may include the identity of the driver. The lane assist system 100 may receive user input, such as a user identification token, a user id or a fingerprint, which identifies the driver, to determine the identity of the driver. For example, a driver's key fob may uniquely identify the driver when the driver opens the door or is within proximity of the vehicle 102. In another example, the lane assist system 100 may obtain a user id from the driver, using the user interface 108, to identify the driver. The lane assist system 100 may use other user interface elements, such as a memory button that configures the position of a mirror or a seat, other sensors, such as a camera that uses facial recognition, or a combination of devices and/or techniques to identify the driver of the vehicle 102. The identity of the driver may be associated with driver behavior patterns that are stored in the memory 110.

The lane assist system 100 may obtain the driving behavior patterns of the driver (206). The memory 110 may have an internal database that associates the identity of the driver with previously stored driver behavior patterns using, for example, a driver profile. The lane assist system 100 may provide the identity of the driver to the internal database and receive the previously stored driver behavior patterns associated with the identity of the driver. The driver behavior patterns may include a rate or amount of acceleration or a rate or amount of change in the steering wheel for the identified driver in a particular driving situation that was previously recorded.

The particular driving situation that was previously recorded may include information gathered about the one or more surrounding vehicles, road condition information, traffic condition information and/or weather condition information. For example, the lane assist system 100 may have identified that the driver is "John Doe." The lane assist system 100 may have previously stored in the memory 110 in a driver profile that "John Doe" has a high rate or amount of acceleration and/or a high rate or amount of change in the steering wheel when another vehicle is in front of the vehicle 102 and other surrounding vehicles in an adjacent lane are travelling at a faster speed. The high rate or amount of acceleration and/or the high rate or amount of change in the steering wheel may indicate that "John Doe" has a higher tendency to switch lanes or is more aggressive than "Jane Doe" who has a lower rate or amount of acceleration and/or a lower rate or amount of change in the steering wheel when driving. That is, "Jane Doe" is less likely to abruptly accelerate and switch lanes when another vehicle is in front of the vehicle 102 even though other surrounding vehicles in adjacent lanes are travelling at a faster speed.

The previously stored driver behavior patterns may be recorded and stored on a previously-traveled route that the driver traversed using the vehicle 102. The identity of the driver and the driver behavior patterns may be associated in the memory 110.

The lane assist system 100 obtains vehicle information of the vehicle 102 (208). The vehicle information may include a current location, direction of travel and/or speed of the vehicle 102. The vehicle information may include a route of travel for the vehicle 102. The lane assist system 100 may obtain the vehicle information using the navigation unit 106 or one or more sensors 112. For example, a vehicle speed sensor may detect the current speed of the vehicle 102. In another example, the navigation unit 106, using a Global Position System (GPS) device, may obtain the current speed, location and/or direction of travel of the vehicle 102.

The lane assist system 100 may obtain surrounding vehicle information (210). The surrounding vehicle information may include the one or more locations of the one or more vehicles surrounding the vehicle 102. The one or more locations of the one or more vehicles surrounding the vehicle 102 may be in one or more lanes. The one or more lanes may be adjacent to the lane that the vehicle 102 is currently traveling in.

The lane assist system 100 may detect the one or more surrounding vehicles using one or more sensors 112, such as a proximity sensor, or a camera. The detection of the one or more surrounding vehicles may be done continuously or regularly, such that the vehicle 102 constantly monitors the surrounding environment for one or more surrounding vehicles. For example, the proximity sensor may detect one or more surrounding vehicles in one or more adjacent lanes that are within a threshold distance of the proximity sensor. The lane assist system 100 may request the surrounding vehicle information from an external database 130 and based on the current location of the vehicle 102 that is provided to the external database 130 obtain the surrounding vehicle information for the one or more vehicles within a threshold distance of the vehicle 102 or traveling on the same roadway or nearby roadway that the vehicle 102 is travelling on. The detection may be done to determine or predict one or more open spaces or areas that the vehicle 102 may move into.

The surrounding vehicle information may include a speed, distance and/or position of the surrounding vehicles. The surrounding vehicle information may include a relative speed, distance and/or position between two vehicles. The relative speed, distance and/or position may be relative between two surrounding vehicle or between the vehicle 102 and one of the surrounding vehicles. For example, the lane assist system 100 may obtain surrounding vehicle information from a third party server that indicates that a first vehicle is traveling a particular distance, such as 2 feet, in front of a second vehicle in an adjacent lane. Additionally, the lane assist system 100 may obtain surrounding vehicle information that indicates that the first vehicle is traveling faster than the second vehicle, such that the distance between the first and second vehicle is increasing. The lane assist system 100 may calculate a difference between the speeds and/or positions of the two vehicles to determine the relative speed, distance and/or position of the surrounding vehicles.

The lane assist system 100 may obtain a lane change indicator (212). The lane change indicator may be provided by any device or sensor 112, e.g., a turn signal, steering wheel or camera, that may indicate that the driver intends to change, move or merge the vehicle 102 into another lane. The lane change indicator may be initiated by the driver. For example, the lane assist system 100 may receive the indication from the turn signal when the driver initiates the turn signal to signal to other drivers that the driver intends to move the vehicle 102 in a particular direction.

The lane assist system 100 may predict that there will be a lane change event (214). The lane assist system 100 may use the one or more sensors 112, such as a camera, to predict that there will be a lane change event. A lane change event is when the vehicle 102 moves from a current lane to an adjacent lane. The lane assist system 100 may determine that there will be a lane change event when the one or more sensors 112 determine that the vehicle 102 is approaching a lane boundary and/or is within a threshold distance of a lane boundary which may indicate that the vehicle 102 will cross over the lane boundary into the adjacent lane.

In some implementations, a camera may capture an image. The lane assist system 100 may use the image to identify the lane boundary and determine a distance from the wheel or side of the vehicle 102 to the lane boundary based on the image. If the distance is less than a threshold distance, the lane assist system 100 may predict that there is a lane change event.

The lane assist system 100 may predict that there will be a lane change event based on the surrounding vehicle information or navigational map information, such as traffic condition information. The lane assist system 100 may determine that traffic in front of the vehicle 102 is slowing or at a stop and/or traffic in one or more adjacent lanes is travelling faster than the vehicle 102 based on the surrounding vehicle information or the traffic condition information. The lane assist system 100 may predict that there is a lane change event if the traffic upfront is slowing or stopped and/or the traffic in one or more adjacent lanes is travelling faster than the traffic in the current lane of the vehicle 102.

The lane assist system 100 determines or predicts whether the vehicle intends to move or is moving to another lane, such as an adjacent lane, based on the lane change indicator and/or the predicted lane change event (216). The lane assist system 100 may determine or predict whether the vehicle 102 intends to move or is moving to another lane, automatically or autonomously, based on the predicted lane change event, or based on driver input, such as from the lane change indicator. A weighted combination of the lane change event or the lane change indicator may be used to calculate the likelihood that the vehicle 102 intends to move to another lane. If the likelihood is greater than or equal to a threshold amount, the lane assist system 100 may determine or predict that the vehicle 102 intends to or is moving from a current lane to another lane.

The lane assist system 100 may determine or predict the movement of the vehicle 102 based on navigational map information and/or a driver's behavior patterns. The lane assist system 100 may use the navigation unit 106 to obtain the navigational map information from one or more external databases 130. For example, if the turn indicator is on and there is no upcoming turn determined from the navigational map information, the lane assist system 100 may predict and/or determine that there is a high probability that the vehicle 102 intends to move or change lanes. In another example, if the predicted route as obtained from the navigational map information has the vehicle 102 exiting soon but the vehicle 102 is in the middle lane, the lane assist system 100 may predict that the vehicle 102 intends to move and/or change lanes so that the vehicle 102 is in the adjacent lane that is exiting.

The lane assist system 100 may obtain the driver behavior patterns that are stored in the memory 110. The lane assist system 100 may account for a driver's behavior pattern and aggressiveness in moving or changing lanes when predicting whether the vehicle 102 intends to or is moving to another lane. For example, a more aggressive driver is more likely to change lanes when the traffic in the adjacent lanes is travelling faster than the current lane of the vehicle 102. Whereas, a more timid a driver is less likely to change lanes.

If the lane assist system 100 determines that the vehicle 102 does not intend to move, change or merge into another lane, the lane assist system 100 continues to monitor the vehicle 102 and the surrounding vehicles.

Figure 3:
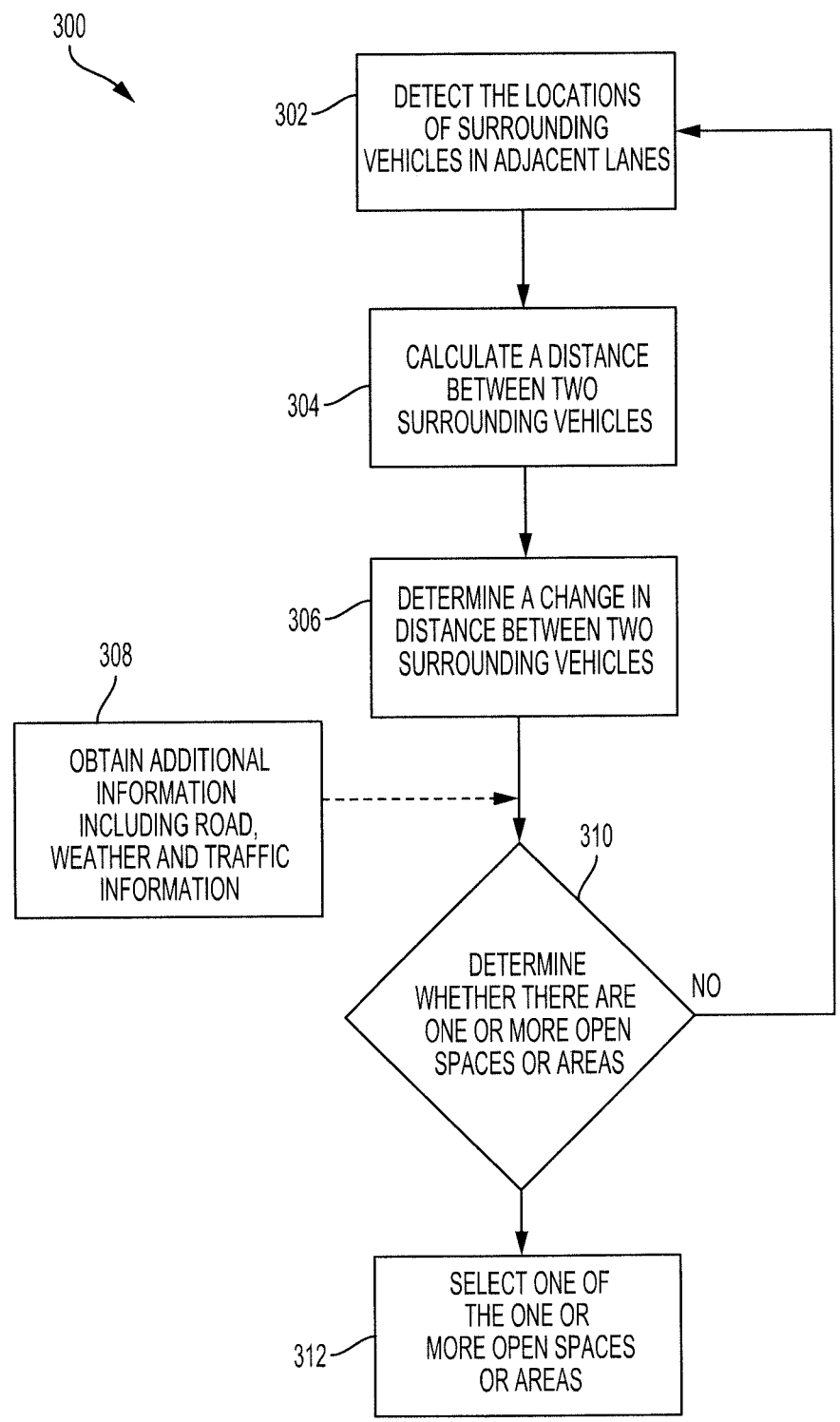
FIG. 3 is a flow diagram of an example process for obtaining the surrounding vehicle information and selecting an open space or area in an adjacent lane for preparing the vehicle 102 to move into according to an aspect of the invention.

In response to determining that the vehicle 102 intends to move, change or merge into another lane, the lane assist system 100 may determine or predict the locations of one or more open spaces or areas in the one or more adjacent lanes based on the vehicle information and the surrounding vehicle information (218). The lane assist system 100 uses the surrounding vehicle information including the speed, distances and/or positions of the surrounding vehicles to determine or predict the locations of one or more open spaces or areas surrounding the vehicle 102. The lane assist system 100 selects one of the one or more open spaces or areas in the one or more adjacent lanes to prepare the vehicle 102 to move or merge into (220). FIG. 3 further describes the process 300 of determining and selecting an open space or area to prepare the vehicle 102 to move into.

Once an open space or area is determined or predicted, the lane assist system 100 prepares the vehicle to move into the open space or area (222). The lane assist system 100 determines or predicts whether the open space or area requires that the vehicle 102 accelerate, decelerate or remain at a constant speed to move the vehicle 102 into the open space or area. The lane assist system 100 may base the determination or prediction on the vehicle information and the surrounding vehicle information, and in particular, the location of the open space or area and the location of the vehicle 102.

The lane assist system 100 may prepare to decelerate the vehicle 102 if the location of the open space or area is determined or predicted to be behind the vehicle 102 in the adjacent lane. The lane assist system 100 may prepare to decelerate the vehicle 102 when the location of the open space or area is in front of the vehicle 102 and the distance between the open space or area and the vehicle 102 is decreasing. This may occur, for example, when the two vehicles that form the open space or area in the adjacent lane are in front of the vehicle 102 but travelling at a slower speed than the vehicle 102, such that the open space or area is approaching the vehicle 102. The driver, for example, may intend to ease into the open space or area.

The lane assist system 100 may perform operations, such as de-spooling the engine 120, partially closing the throttle valve, and/or managing the power flow of the battery 134 using the BMCU 132 to prepare to store electrical energy generated from the regenerative brakes to prepare the vehicle for deceleration. Other operations may include turning the engine 120 off, initializing the regenerative brakes, opening a clutch, up-shifting the vehicle 102 or other operations to support deceleration of the vehicle 102.

The lane assist system 100 may prepare to accelerate the vehicle 102 if the location of the open space or area is determined or predicted to be in front of the vehicle 102 in the adjacent lane. The lane assist system 100 may prepare to accelerate the vehicle 102 when the location of the open space or area is behind the vehicle 102 and the distance between the open space or area and the vehicle 102 is decreasing. This may occur, for example, when the two vehicles that form the open space or area in the adjacent lane are behind the vehicle 102 but travelling at a faster speed than the vehicle 102, such that the open space or area is approaching the vehicle 102. The driver may, for example, intend to ease into the open space or area.

The lane assist system 100 may perform operations, such as spooling the engine 120, turning the engine 120 on, partially opening the throttle valve, and/or preparing the battery 134 using the BMCU 132 to provide electrical energy generated to the motor and/or generator 122 to prepare the vehicle 102 for acceleration. Other operations may include initializing the motor and/or generator 122 to convert fuel energy into electrical energy or down-shifting the vehicle 102 to prepare the vehicle 102 for acceleration. The degree of preparation of the operation may depend on an amount of acceleration or deceleration the lane assist system 100 anticipates utilizing to move the vehicle 102 into the open space or area. The amount may be based on the distance between the vehicle 102 and the open space or area that the vehicle 102 plans to move into.

The lane assist system 100 may prepare to maintain a constant speed for the vehicle 102 if the location of the open space or area is determined or predicted to be next to the vehicle 102 in the adjacent lane. The lane assist system 100 may perform operations, such as maintaining the current speed of the vehicle 102 by implementing the cruise-control feature to maintain a current state of the engine 120, the motor and/or generator 122, the regenerative brakes 116, the battery 134 and/or the BMCU 132. The preparation of the vehicle 102 to perform operations, such as accelerating, decelerating or maintaining a constant speed includes, but is not limited to, the preparation of fuel energy sources and non-fuel energy sources and the preparation of fuel energy propulsion components and non-fuel energy propulsion components. Fuel energy sources include gasoline or diesel powered engines. Non-fuel energy sources include fuel cells, such as hydrogen and/or electric fuel cells.

The lane assist system 100 may provide an indicator to the driver through the user interface 108 when the lane assist system 100 is preparing the vehicle 102 to merge into another lane (224). The indicator may be an audio and/or visual indication that indicates to the driver that the lane assist system 100 is preparing the vehicle 102 to accelerate, decelerate or maintain a constant speed to move into another lane. The lane assist system 100 may store the indicator in the memory 110 to act as a flag to indicate the lane assist system is preparing the vehicle 102 to move into an adjacent lane. The indicator may reset once the vehicle 102 has moved into the adjacent lane or the preparation has been overridden.

FIG. 3 is a flow diagram of an example process 300 for obtaining the surrounding vehicle information and selecting an open space or area in an adjacent lane for preparing the vehicle 102 to move into. One or more computers or one or more data processing apparatuses, for example, the ECU 104 of the lane assist system 100 of FIG. 1, appropriately programmed, may implement the process 300.

The lane assist system 100 detects or obtains the one or more locations of the one or more surrounding vehicles in the one or more adjacent lanes based on the current location of the vehicle 102 that may be included in the navigational map information (302). The navigational map information may be obtained using the navigation unit 106. The one or more surrounding vehicles may be vehicles within a proximity or particular distance of the current location of the vehicle 102. The one or more surrounding vehicles may be determined by obtaining surrounding vehicle information from one or more external databases 130, a proximity sensor, one or more external databases 130 or by using Vehicle-to-Vehicle (V2V) communication. The lane assist system 100 calculates or determines the surrounding vehicle information including the speed, distances or positions of the surrounding vehicles and/or the relative distances, positions or difference in speed between two vehicles.

The relative speeds, distances and/or positions of the two vehicles may indicate that there is an open space or area if the distance between the two vehicles is greater than a threshold amount. The lane assist system 100 calculates a distance between the two surrounding vehicles to determine a size of the open space or area (304). The lane assist system 100 may calculate a difference between the positions of the two surrounding vehicles to determine the distance and/or size of the open space or area between the two surrounding vehicles.

The lane assist system 100 may determine the change in distance or size of the open space or area between the two surrounding vehicles (306). The lane system may calculate the change in the size of the open space or area based on the speed of the two vehicles or the positions of the two vehicles over a period of time.

The lane assist system 100 may obtain additional information including road condition, weather condition and/or traffic condition information (308). The additional information may be included in the navigational map information obtained from the navigation unit 106 or obtained from one or more external databases 130. The additional information may be used to determine if there are one or more open spaces or areas in the one or more adjacent lanes.

The lane assist system 100 determines whether there are one or more open spaces or areas in an adjacent lane (310). The lane assist system 100 may compare the determined distance or size of the open space or area between two vehicles to a threshold value, and if the determined distance is greater than or equal to the threshold value, the lane assist system 100 may determine that there is an open space or area. For example, if the distance between the two vehicles in an adjacent lane is 1.5 car lengths, or approximately 12 feet, which is greater than a threshold value, such as 8 feet or 1 car length, the lane assist system 100 may determine that there is an open space or area in the adjacent lane. The threshold value may be variable, such that the threshold value may be based on the speed of the two vehicles in the adjacent lane that form the open space or area. The threshold value may be based on other factors, such as weather information, traffic information and/or road condition information. If the lane assist system 100 does not detect or determine that there is a vehicle in front or behind a surrounding vehicle in an adjacent lane, the lane assist system 100 may determine that the open space or area is of a size greater than the threshold value, i.e., of sufficient size to move into.

If the lane assist system 100 determines that there are no open spaces or areas, the lane assist system 100 returns to monitoring the location of the surrounding vehicles. If the lane assist system 100 determines that there are open spaces or areas, the lane assist system 100 selects one of the one or more open spaces or areas. The lane assist system 100 selects one of the one or more open spaces or areas (312). The lane assist system 100 may select the one of the one or more open spaces or areas to prepare the vehicle 102 to move into based on driver behavior patterns and/or navigational map information including traffic condition information and/or the route. For example, if the stored driver behavior patterns indicate that the driver is more aggressive, the lane assist system 100 may select an open space or area that is in front of the vehicle 102 or in an adjacent lane where the flow of traffic is traveling faster than the current lane the vehicle 102 is travelling in. If, however, the stored driver behavior patterns indicate that the driver is more passive, the lane assist system 100 may select an open space or area that is behind the vehicle 102.

The lane assist system 100 may use the navigational map information to determine which one of the one or open space or areas to select. For example, if the traffic condition information included in the navigational map information indicates that there is traffic in the adjacent lane to the right, the lane assist system 100 may select an open space or area in the adjacent lane to the left. In another example, if the route that the vehicle 102 is travelling has the vehicle 102 exiting and the vehicle 102 is in the middle lane as the highway exit approaches, the lane assist system 100 may select an open space or area in the exit lane that allows the vehicle 102 to safely exit in time.

Figure 4:
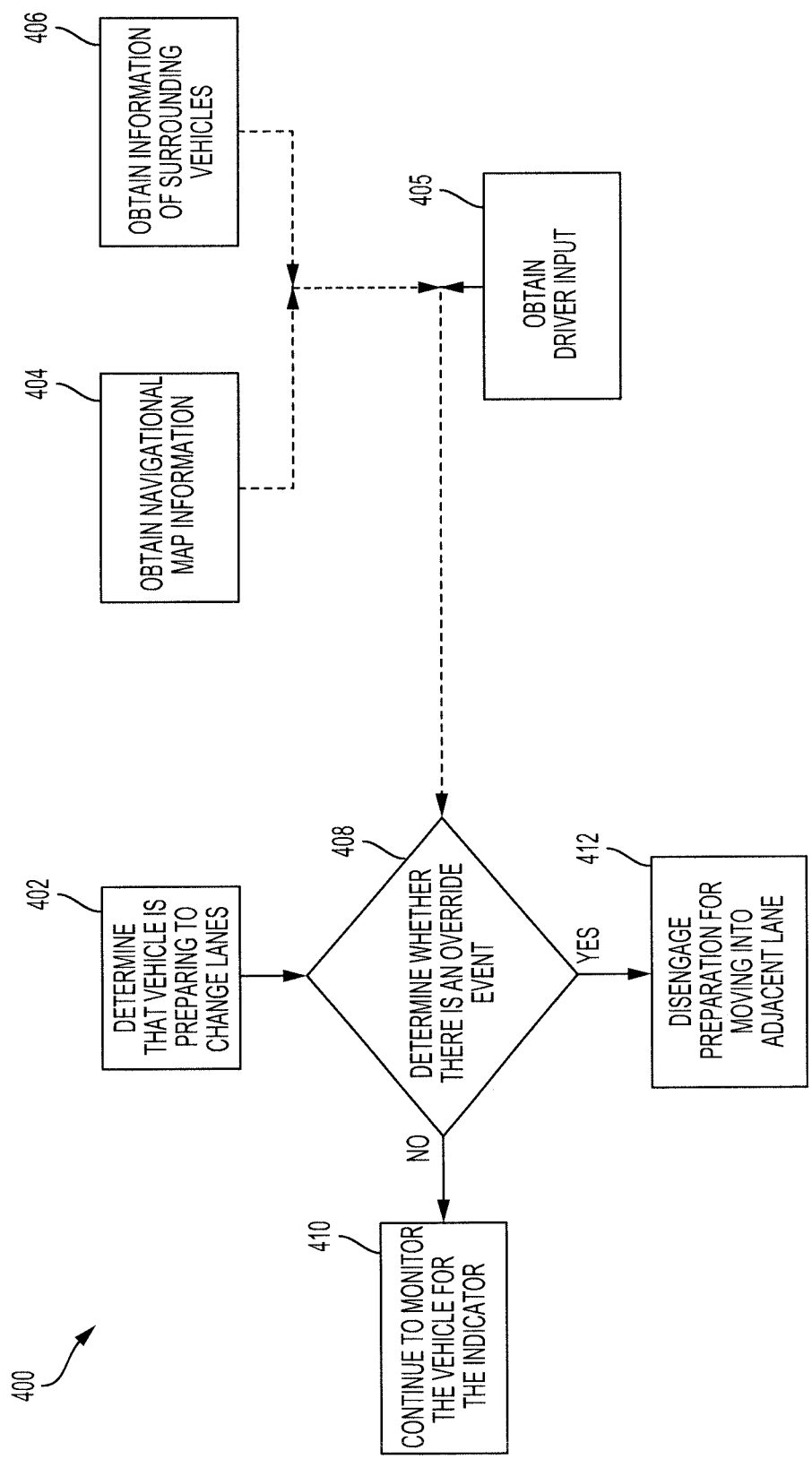
FIG. 4 is a flow diagram of an example process 400 for overriding the preparations of the vehicle 102 to change lanes according to an aspect of the invention.

FIG. 4 is a flow diagram of an example process 400 for overriding the preparations of the vehicle 102 to change lanes. One or more computers or one or more data processing apparatuses, for example, the ECU 104 of the lane assist system 100 of FIG. 1, appropriately programmed, may implement the process 400.

The lane assist system 100 determines that the vehicle 102 is preparing to move to an adjacent lane from a current lane (402). When the lane assist system 100 prepares the vehicle to move into the open space or area of an adjacent lane, the lane assist system 100 may store an indicator to indicate the lane assist system 100 is preparing the vehicle 102 to move. The lane assist system 100 may check or obtain the indicator stored from the memory 110 to determine the state of the lane assist system 100, such as whether the lane assist system 100 is preparing the vehicle 102 to move to the adjacent lane.

The lane assist system 100 may obtain navigational map information (404). The navigational map information may be used to determine whether there is an override event that disengages the preparation of the vehicle 102 to move to the open space or area of an adjacent lane.

The lane assist system 100 may obtain driver input (405). The driver input may be a disabling or enabling of a turn indicator to indicate that a driver does or does not intend to merge or move into an open space area of the adjacent lane from the current lane of the vehicle 102. The lane assist system 100 may obtain surrounding vehicle information, as previously described above (406).

The lane assist system 100 determines whether there is an override event (408). An override event is an event that causes the vehicle 102 to disengage preparation of the vehicle to move to the adjacent lane. An override event, for example, may be a hazard in the adjacent lane and/or the current lane of the vehicle 102 that would cause the vehicle 102 to be unable to move into the adjacent lane, such as stopped traffic. In another example, an override event may be driver input that indicates the driver does not intend to move the vehicle into the adjacent lane, such as disabling a turn signal or other indicator. The lane assist system 100 may determine whether there is an override event based on the driver input, navigational map information and/or surrounding vehicle information.

If the lane assist system 100 determines that there is no override event, the lane assist system 100 continues to monitor the vehicle 102 for the indicator that indicates when the vehicle 102 is preparing the vehicle to merge or move into an adjacent lane from the current lane (410). If the lane assist system 100 determines that there is an override event, the lane assist system 100 disengages the preparation of the vehicle 102 for moving into the adjacent lane (412). The lane assist system 100 may de-spool the engine 120, return the throttle valve to the original position prior to partially opening or closing the throttle valve, and/or deactivate control over the battery 134 and/or BMCU 132.

Figure 5A:
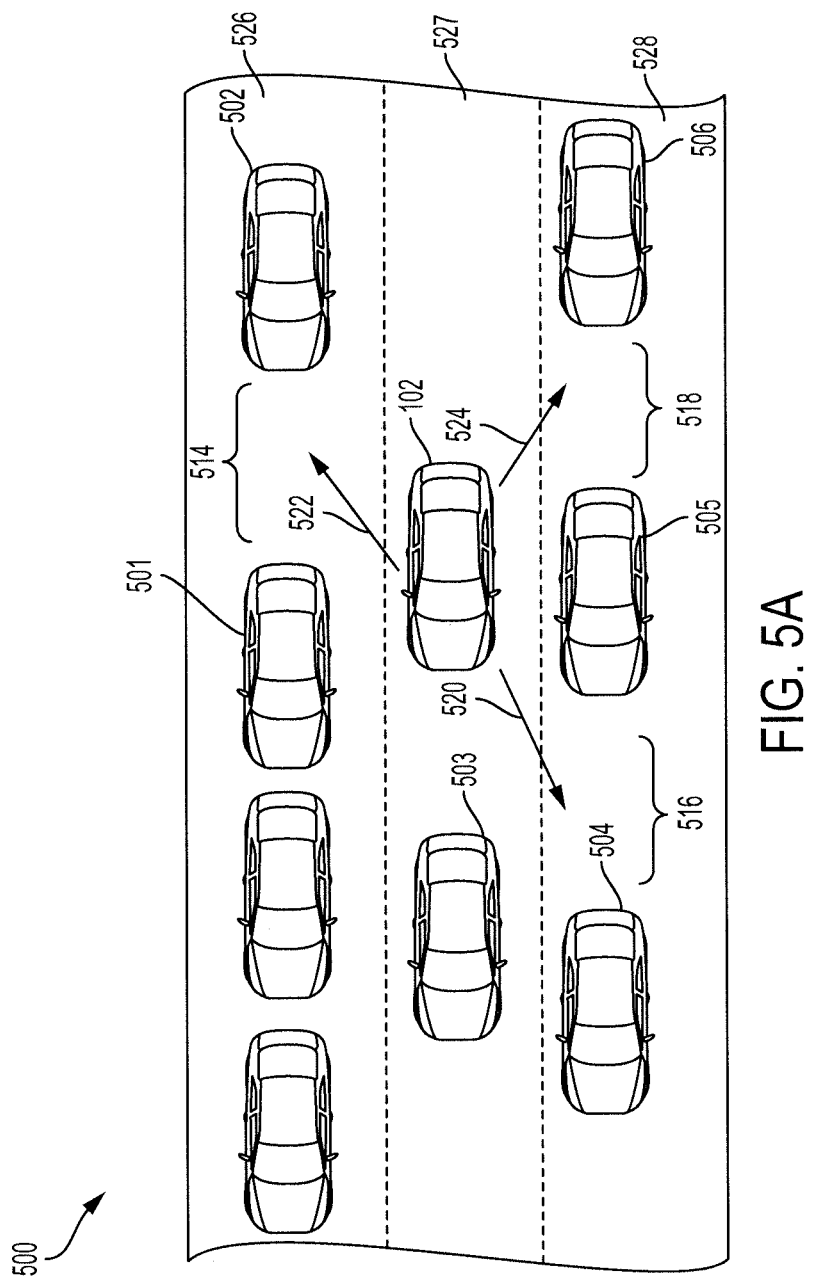
FIGS. 5A-5C show example illustrations of use cases of when the lane assist system of FIG. 1 may be used to prepare the vehicle to move from a current lane to an adjacent lane according to an aspect of the invention.
Figure 5B:
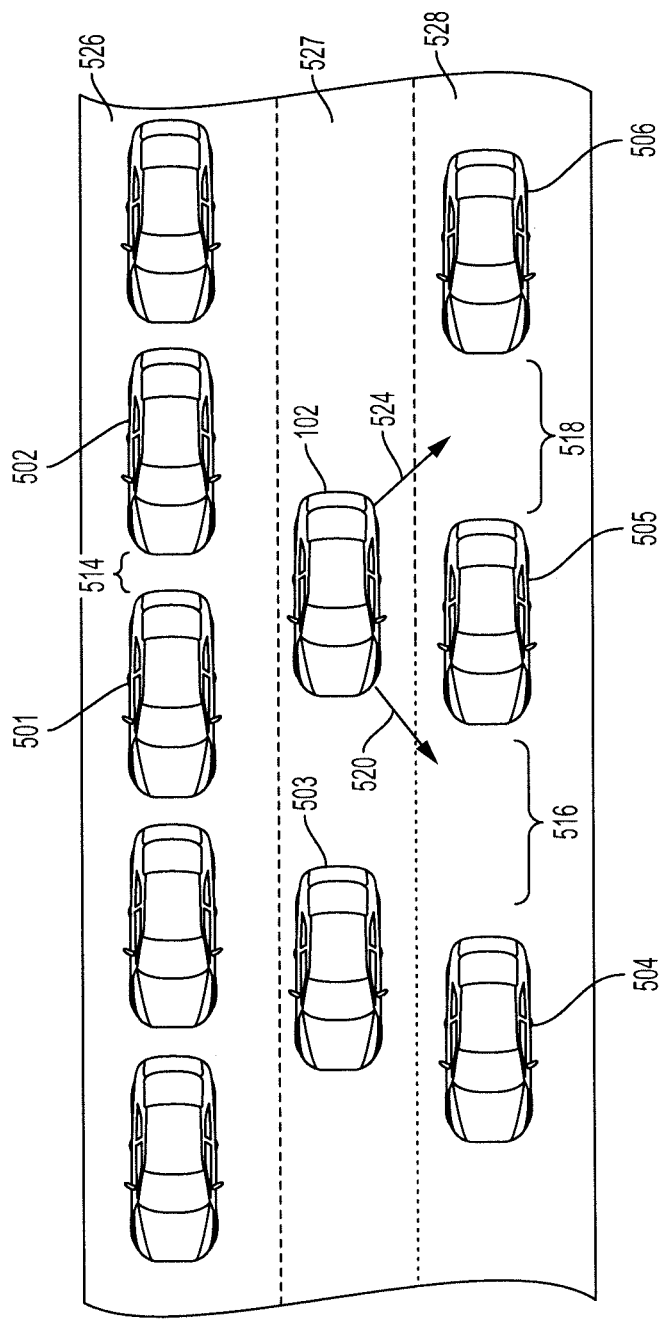
Figure 5C:
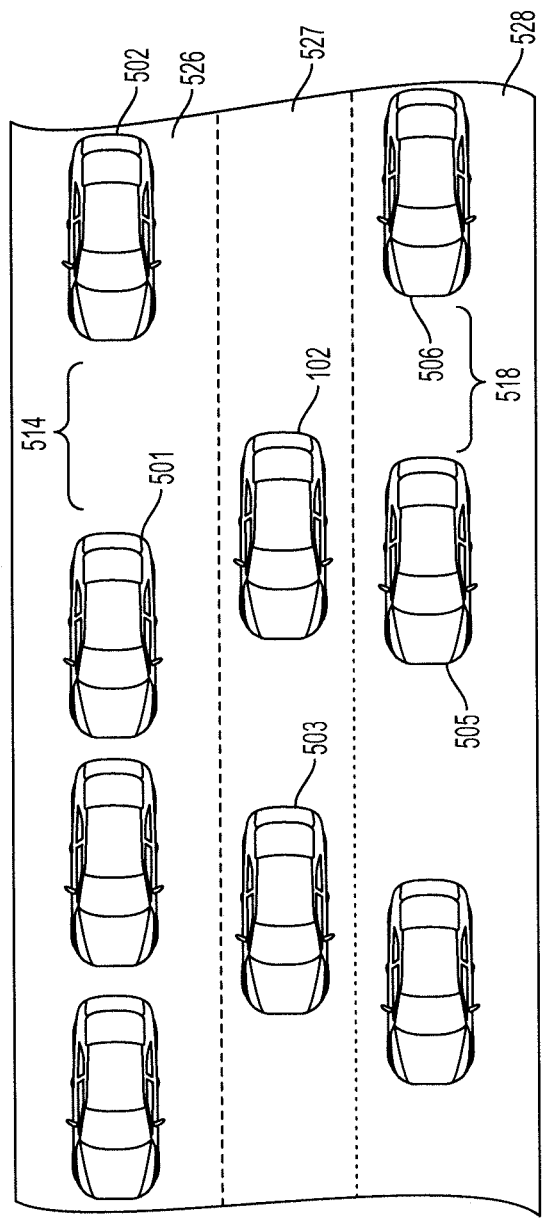

FIGS. 5A-5C show illustrations of use cases of when the lane assist system 100 of FIG. 1 prepares a vehicle 102 to move from a current lane to an adjacent lane. FIG. 5A shows a vehicle 102 with the lane assist system 100 traveling on a roadway, such as a highway. The vehicle 102 is surrounded by one or more surrounding vehicles 501-506. The lane assist system 100 may use one or more sensors 112, such as a proximity sensor, or access one or more external databases 130 to obtain and/or determine the surrounding vehicle information including the one or more locations of the one or more surrounding vehicles 501-506. The lane assist system 100 may predict or determine one or more open spaces or areas 514, 516, 518 in the adjacent lanes 526, 528 for the vehicle 102 to move into.

The lane assist system 100 of the vehicle 102 may determine or predict that the vehicle 102 intends to move into an adjacent lane 526, 528 from the current lane 527 and determine which one of the one or more open spaces or areas 514, 516, 518 the vehicle 102 intends to move into. The lane assist system 100 may calculate the size of the one or more open spaces or areas 514, 516, 518 and/or a distance between the vehicles 501, 502, the vehicles 504, 505 and/or the vehicles 505, 506, respectively. If the size of the one or more open spaces or areas 514, 516, 518 is greater than a threshold size, i.e., the distance between the vehicles is greater than a threshold distance, the open space or area corresponding to the size that is greater than a threshold size may be a viable open space or area for the vehicle 102 to move into.

The lane assist system 100 may determine which of the one or more open spaces or areas to move into based on driver behavior patterns, road condition information, navigational map information or other information. The lane assist system 100 may prepare the vehicle 102 to move or merge the vehicle 102 into the adjacent lane 526, 528. The lane assist system 100 prepares the vehicle 102 for acceleration if the lane assist system determines that the vehicle 102 is to move into the open space or area 516, e.g., in direction 520, or for deceleration if the lane assist system 100 determines that the vehicle 102 is moving into the open spaces or areas 514, 518, e.g., in direction 522, 524, respectively.

FIG. 5B shows a vehicle 102 with the lane assist system 100 traveling on a roadway, such as a highway, where the lane assist system 100 encounters an override event. The lane assist system 100 may initially determine to prepare the vehicle 102 to move in direction 520 or 524 to move into an open space or area 516 or 518, respectively. The lane assist system 100 may determine that there may be an override event that prevents the vehicle 102 from moving into one of open spaces or areas 516, 518. The lane assist system 100 may determine that the adjacent lane 528 merges into the current lane 527 based on navigational map information that indicates that the adjacent lane 528 moves into current lane 527. Thus, the vehicle 102 is unable to move into the open spaces or areas 516, 518, and so disengages preparation of the vehicle 102. The lane assist system 100 may determine that the adjacent lane 526 is filled with traffic based on traffic condition information included in the navigational map information or based on the surrounding vehicle information, e.g., by determining that the distance between the two vehicle 501, 502 is less than a threshold distance or that the size of the open space or area 514 is less than a threshold amount. If there is traffic in the adjacent lane 526 and/or the size of the open space or area 514 is less than the threshold amount, the lane assist system 100 may not prepare the vehicle 102 to move into the adjacent lane 526.

FIG. 5C shows a vehicle 102 with the lane assist system 100 traveling on a roadway, such as a highway, where the lane assist system 100 chooses between different open spaces or areas to move into. The lane assist system 100 may determine that the vehicle is unable to move into the open spaces or areas 516, 518 because the adjacent lane 528 merges into the current lane 526 based on the navigational map information. Instead, as the vehicle 503 slows down, the lane assist system 100 may predict that the vehicle 102 intends to move into the open space or area 514 in the adjacent lane 526.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A lane assist system for a vehicle, comprising:
   a sensor configured to detect a first surrounding vehicle and a second surrounding vehicle in an adjacent lane; and
   an electronic control unit coupled to the sensor and configured to:
      obtain driver behavior patterns of a driver of the vehicle,
      predict or determine that the vehicle will change lanes from a current lane to the adjacent lane based on the driver behavior patterns of the driver of the vehicle,
      determine a relative distance between the first surrounding vehicle and the second surrounding vehicle, and
      control an amount of power provided or generated to accelerate or decelerate the vehicle into an open space or area that is in between the first surrounding vehicle and the second surrounding vehicle in the adjacent lane when the relative distance is greater than a threshold distance.

2. The lane assist system of claim 1, further comprising:
   a battery for storing electrical energy;
   a battery management unit for managing charging and discharging of the electrical energy of the battery to power movement of the vehicle; and
   a motor that uses the electrical energy to power movement of the vehicle.

3. The lane assist system of claim 1, wherein the electronic control unit is configured to determine a location of the open space or area in the adjacent lane based on a location of the first surrounding vehicle and a location of the second surrounding vehicle.

4. The lane assist system of claim 3, wherein the electronic control unit is configured to:
   determine the location of the first surrounding vehicle in the adjacent lane;
   determine the location of the second surrounding vehicle in the adjacent lane; and
   compare the relative distance to the threshold distance.

5. The lane assist system of claim 4, wherein the threshold distance is based on at least one of weather condition information, road condition information or surrounding vehicle information.

6. The lane assist system of claim 1, further comprising:
   one or more external databases that provide surrounding vehicle information of one or more surrounding vehicles; and
   a navigation unit for providing a current location of the vehicle;
   wherein the electronic control unit is connected to the navigation unit and the one or more external databases via a network and is configured to determine a location of the first surrounding vehicle and a location of the second surrounding vehicle based on the current location of the vehicle and the surrounding vehicle information.

7. The lane assist system of claim 1, further comprising:
   a user interface element for receiving driver input that indicates that the driver intends to merge the vehicle into the adjacent lane;
   wherein the electronic control unit is configured to:
      obtain the driver input that indicates that the driver intends to merge into the adjacent lane, or
      obtain a lane change event, and
      autonomously or automatically, predict or determine that the vehicle will change lanes from the current large to the adjacent lane further based on the lane change event, or
      predict or determine that the vehicle will change lanes from the current lane to the adjacent lane further based on the driver input.

8. The lane assist system of claim 1, further comprising:
   a user interface configured to provide an indication that the vehicle is preparing to move from the current lane to the adjacent lane;
   wherein the electronic control unit is configured to provide the indication that the vehicle is preparing to move to the user interface.

9. The lane assist system of claim 1, wherein the electronic control unit is configured to determine whether the vehicle needs to accelerate or decelerate to move into the open space or area in the adjacent lane.

10. The lane assist system of claim 9, wherein to control the amount of power provided or generated the electronic control unit is configured to spool an engine of the vehicle if the vehicle needs to accelerate.

11. The lane assist system of claim 1, further comprising:
    a memory configured to store the driver behavior patterns;
    wherein the electronic control unit is configured to:
       determine an identity of the driver, and
       obtain the driver behavior patterns of the driver based on the identity of the driver.

12. The lane assist system of claim 1, wherein the driver behavior patterns include an indication of a tendency or a likelihood of the driver to switch lanes.

13. A method for controlling operation of a vehicle to assist in lane changing, comprising:
    determining or predicting, by an electronic control unit, that the vehicle will change lanes from a current lane to an adjacent lane based on driver behavior patterns of a driver of the vehicle;
    detecting, by the electronic control unit, a first surrounding vehicle and a second surrounding vehicle in the adjacent lane;

determining, by the electronic control unit, a relative distance between the first surrounding vehicle and the second surrounding vehicle in the adjacent large; and controlling, by the electronic control unit, an amount of power provided or generated to accelerate or decelerate the vehicle into an open space or area that is in between the first surrounding vehicle and the second surrounding vehicle in the adjacent lane when the relative distance is greater than a threshold distance.

14. The method of claim 13, wherein controlling the amount of power provided or generated includes at least one of spooling an engine of the vehicle or managing electrical discharge of a battery of the vehicle.

15. The method of claim 13, further comprising:

determining, by the electronic control unit, a location of the open space or area; and determining whether the vehicle needs to accelerate or decelerate to move into the location of the open space or area.

16. A lane assist system for a vehicle, comprising:

an electronic control unit configured to:

determine a first location of a first surrounding vehicle in a first adjacent lane, determine a second location of a second surrounding vehicle in the first adjacent lane, predict or determine that the vehicle will change lanes from a current lane to the first adjacent lane based on driver behavior patterns of a driver of the vehicle, determine a relative distance between the first surrounding vehicle and the second surrounding vehicle based on the first location and the second location, determine a variable threshold distance based on a speed of the first surrounding vehicle and a speed of the second surrounding vehicle, and control operations of the vehicle to move the vehicle into an open space or area that is in between the first surrounding vehicle and the second surrounding vehicle in the first adjacent lane when the relative distance is greater than the variable threshold distance including an amount of power provided or generated to accelerate or decelerate the vehicle into the open space or area.

17. The lane assist system of claim 16, wherein the electronic control unit is further configured to:

obtain a lane merge indicator; and predict or determine that the vehicle will change lanes from the current lane to the first adjacent lane based on the lane merge indicator.

18. The lane assist system of claim 16, wherein the electronic control unit is configured to control the operations of the vehicle in response to the prediction or determination that the vehicle will change lanes from the current lane to the first adjacent lane.

19. The lane assist system of claim 16, wherein the electronic control unit is configured to:

determine a location of the open space or area in the first adjacent lane based on the location of the first surrounding vehicle and the location of the second surrounding vehicle in the first adjacent lane; and determine a location of a second open space or area in a second adjacent lane based on location of a third surrounding vehicle in the second adjacent lane.

20. The lane assist system of claim 16, wherein the electronic control unit is configured to:

determine that there is an override event; and disengage control of the operations of the vehicle that move the vehicle.

* * * * *